United States Patent [19]

Fujisawa et al.

[11] Patent Number: 5,321,071

[45] Date of Patent: Jun. 14, 1994

[54] SHORT FIBER-CONTAINING POLYMER COMPOSITION AND METHOD FOR CONTROLLING ELECTRICAL RESISTANCE OF THE POLYMER COMPOSITION

[75] Inventors: Eiji Fujisawa; Yasunobu Isobe; Hiroaki Shono, all of Fukushima, Japan

[73] Assignees: Nitto Boseki Co., Ltd., Fukushima; Kawasaki Steel Corporation, Kobe; Mitsubishi Gas Chemical Company, Inc., Tokyo, all of Japan

[21] Appl. No.: 967,025

[22] Filed: Oct. 27, 1992

[30] Foreign Application Priority Data

Oct. 29, 1991 [JP] Japan ................. 3-283070

[51] Int. Cl.$^5$ ............................. C08K 3/04
[52] U.S. Cl. ..................... 524/496; 524/495; 523/215
[58] Field of Search ............ 524/495, 496, 440, 441, 524/442; 523/215

[56] References Cited

U.S. PATENT DOCUMENTS

| | | | |
|---|---|---|---|
| 4,579,902 | 4/1986 | O'Brien | 524/496 |
| 4,752,415 | 6/1988 | Iwaskow et al. | 524/496 |

FOREIGN PATENT DOCUMENTS

| | | |
|---|---|---|
| 77059 | 4/1983 | European Pat. Off. |
| 100670 | 2/1984 | European Pat. Off. |
| 151448 | 8/1985 | European Pat. Off. |
| 207792 | 1/1987 | European Pat. Off. |
| 55-43126 | 3/1980 | Japan . |
| 63-22861 | 1/1988 | Japan . |
| 2300263 | 12/1990 | Japan . |
| WO9209992 | 6/1992 | World Int. Prop. O. |

OTHER PUBLICATIONS

Nippon Setchaku Kyokai Shi, "Dispersion of Conductive Particles in Filled Polymers", Journal of Japan Adhesive Association, vol. 23, No. 3, pp. 103–111 (1987).
Derwent Publications Ltd., London, AN 87-019369 & JP-A-61 278 566, Dec. 9, 1986, abstract.
Derwent Publications Ltd., London, AN 85-033459 & JP-A-59 225 927, Dec. 19, 1984, abstract.
Derwent Publications Ltd., London, AN 87-7673 & JP-A-62 086 054, Apr. 20, 1987, abstract.
European Search Report.

*Primary Examiner*—Paul R. Michl
*Assistant Examiner*—Edward J. Cain
*Attorney, Agent, or Firm*—Wegner, Cantor, Mueller & Player

[57] ABSTRACT

The present invention provides a short-fiber containing composition inhibited from electrostatic charging and having practical insulating properties. This composition has a volume resistivity of $10^5$–$10^{13}$ $\Omega$cm and comprises 10–40 parts by weight of at least one kind of short fibers having a volume resistivity of $10^{-1}$–$10^3$ $\Omega$cm and 90–60 parts by weight of a polymer or comprises 10–40 parts by weight of a mixture comprising at least one kind of short fibers having a volume resistivity of less than $10^{-1}$ $\Omega$cm and at least one kind of short fibers having a volume resistivity of $10^{-1}$ $\Omega$cm or more and 90–60 parts by weight of a polymer. A method for controlling the polymer composition to $10^5$–$10^{13}$ $\Omega$cm in volume resistivity is also provided.

10 Claims, 1 Drawing Sheet

SHORT FIBER-CONTAINING POLYMER COMPOSITION AND METHOD FOR CONTROLLING ELECTRICAL RESISTANCE OF THE POLYMER COMPOSITION

BACKGROUND OF THE INVENTION

The present invention relates to a short fiber-containing polymer composition controlled in volume resistivity which is an index for electrical resistance to a specific range and a method for controlling the volume resistivity of a polymer composition using a short fiber or a short fiber mixture having a specific volume resistivity.

Polymeric composite materials are widely used in various industrial fields for ease of production and in molding thereof. Especially, since polymeric compounds generally show excellent electric insulation, they are often used for electronic parts.

In general, the higher electric insulation is demanded for electronic parts made of polymeric compounds and fiber-reinforced polymeric composite materials, but when they are actually used as a part of the equipments, electrostatic charging occurs resulting in problems such as adsorption of dust. Therefore, the insulation of polymeric compounds which is normally $10^{15}$–$10^{16}$ $\Omega$cm in terms of volume resistivity must be adjusted to about $10^9$–$10^{11}$ $\Omega$cm in actual use by imparting some electrical conductivity by some means.

One representative method for imparting electrical conductivity to polymeric compounds is to add carbon black and the results of a basic study on this method are reported by Sumita in "Journal of Japan Adhesive Association (Nippon Setchaku Kyokai Shi)", Vol. 23, No. 3, Pages 103-111 (1987).

Although electrical conductivity can be easily imparted by the addition of carbon black, since carbon black has a strong conductivity and is in the form of powder, when dispersibility is increased, it is difficult to enhance stepwise the continuity of electricity and when the addition amount exceeds a certain degree, the electrical conductivity abruptly increases. Therefore, it is very difficult by the use of carbon black to produce polymer compositions or polymer moldings having a low conductivity of about $10^9$–$10^{11}$ $\Omega$cm at a high productivity.

Furthermore, Japanese Patent Kokai (Laid-Open) No. Hei 2-300263 discloses polymeric materials of low surface resistivity made by incorporating superfine carbon fibers into a polymer.

However, though these carbon fibers mentioned in the patent publication are effective for merely antistatic purpose or for removal of problems caused by static electricity, it is difficult by using only the carbon fibers to obtain polymer compositions having a weak electrical conductivity of about $10^9$–$10^{11}$ $\Omega$cm as in the case of carbon black because they are very high in electrical conductivity and besides, it is very difficult to produce industrially the compositions having the specific range of resistivity. Thus, generally use of them cannot be considered.

One attempt to solve the problems which cannot be solved only by using the above-mentioned carbon black or superfine carbon fibers is reported in Japanese Patent Kokai (Laid-Open) No. Sho 63-22861. This patent publication discloses polymer compositions in which char carbon is used as a filler having a selected surface resistivity.

However, since raw materials for the char carbon are straws of natural plants, they are inferior in quality stability and variation is apt to occur in properties of the resulting char carbon. Moreover, there occur changes in availability of the raw material straw and price of the raw material depending on whether the raw material plants are good or bad in harvest and hence, they are unsuitable as industrial materials. Furthermore, according to the Examples given in the above patent publication, even if the char carbon is added, since other filler is carbon black, volume resistivity of the composition is not stable. In addition, the char carbon is in amorphous or particulate form and does not have severe fibrous form. Thus, delicate control of resistivity in the range of $10^7$–$10^{11}$ $\Omega$cm is difficult.

SUMMARY OF THE INVENTION

The object of the present invention is to provide a polymer composition inhibited from electrostatic charging and having practical insulating performance and a method for control of electric resistance in order to provide the above composition.

As a result of the intensive research conducted by the inventors, it has been found that electrical conductivity of polymer compositions can be easily controlled by adding to a polymer a short fiber of a material having relatively high electrical resistance, or a mixture of an electrically conductive short fiber and a short fiber having high electrical resistance. Thus, the present invention has been accomplished.

That is, the first point of the present invention is a short fiber-containing polymer composition having a volume resistivity of $10^5$–$10^{13}$ $\Omega$cm which comprises 10–40 parts by weight of at least one kind of short fibers having a volume resistivity of $10^{-1}$–$10^3$ $\Omega$cm and 90–60 parts by weight of a polymer.

The second point of the present invention is a short fiber-containing polymer composition having a volume resistivity of $10^5$–$10^{13}$ $\Omega$cm comprises 10–40 parts by weight of a mixture comprising at least one kind of short fiber having a volume resistivity of less than $10^{-1}$ $\Omega$cm and at least one kind of short fiber having a volume resistivity of $10^{-1}$ $\Omega$cm or more and 90–60 parts by weight of a polymer.

The third point of the present invention is a method for controlling the volume resistivity of a polymer composition to $10^5$–$10^{13}$ $\Omega$cm, characterized by incorporating at least one kind of short fiber having a volume resistivity of $10^{-1}$–$10^3$ $\Omega$cm into a polymer.

The fourth point of the present invention is a method for controlling the volume resistivity of a polymer composition to $10^5$–$10^{13}$ $\Omega$cm, characterized by incorporating into a polymer a mixture comprising at least one kind of short fiber having a volume resistivity of less than $10^{-1}$ $\Omega$cm and at least one kind of short fibers having a volume resistivity of $10^{-1}$ $\Omega$cm or more.

Furthermore, with reference to the method for controlling the volume resistivity of a polymer composition, especially the fifth point is a method for controlling the volume resistivity of a polymer composition to a specific value in the range of $10^5$–$10^{13}$ $\Omega$cm, characterized by incorporating at least one kind of short fiber having a volume resistivity of $10^{-1}$–$10^3$ $\Omega$cm into a polymer, and the sixth point is a method for controlling the volume resistivity of a polymer composition to a specific value in the range of $10^5$–$10^{13}$ $\Omega$cm, characterized by incorporating into a polymer a mixture comprising at least one kind of short fiber having a volume resistivity of less than $10^{-1}$ Ωcm and at least one kind of short fiber having a volume resistivity of $10^{-1}$ Ωcm or more.

DESCRIPTION OF THE INVENTION

Figure 1:
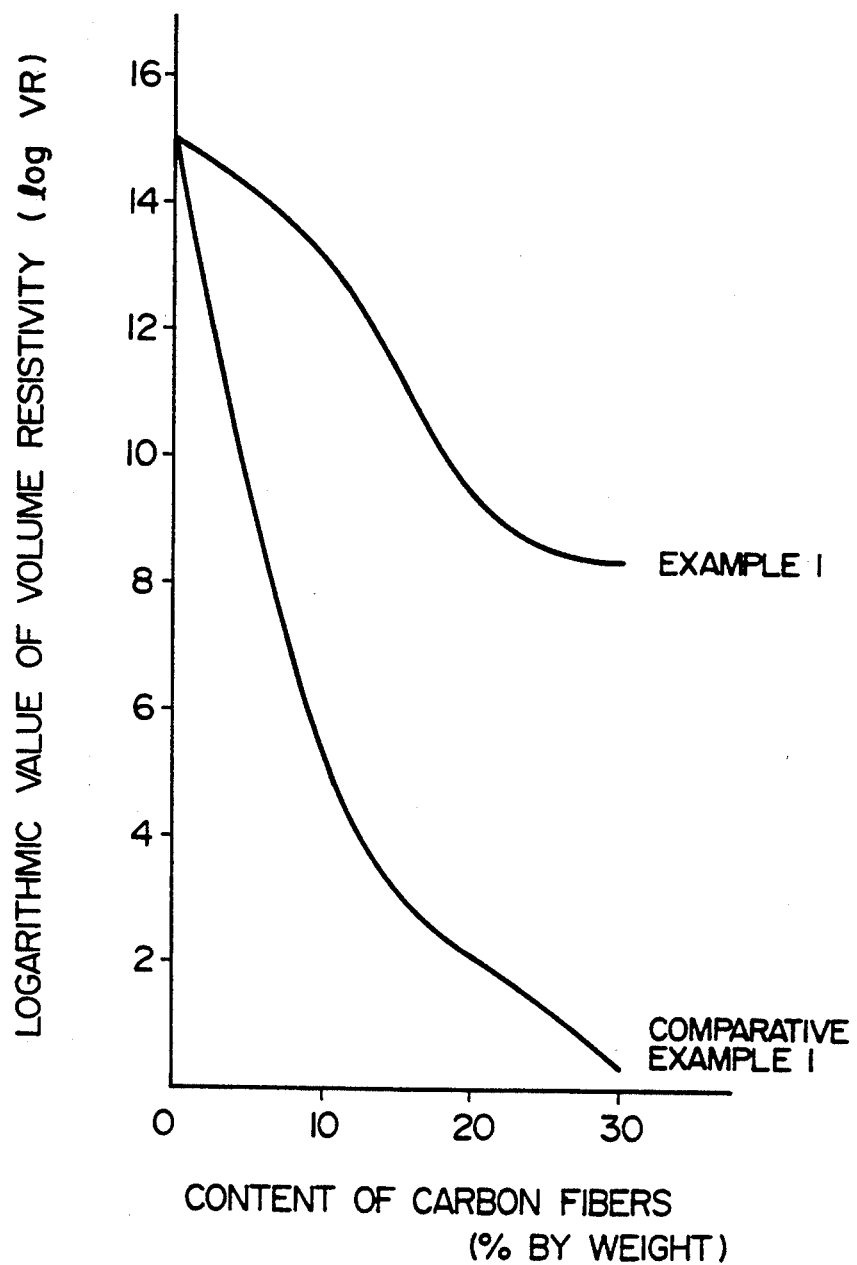
FIG. 1 is a graph which shows the relation between the content of carbon fibers and the volume resistivity.

The short fiber-containing polymer composition and the method for controlling the volume resistivity of a polymer composition according to the present invention will be explained in detail.

As the materials of the short fibers having a volume resistivity of $10^{-1}$–$10^3$ Ωcm used in the present invention, mention may be made of, for example, carbon fibers subjected to oxidation treatment, carbon fibers obtained by incomplete carbonization at a firing temperature of lower than 800° C. and fibers of germanium for the short fibers.

For the short fibers having a volume resistivity of less than $10^{-1}$ Ωcm, mention may be made of, for example, general carbon fibers obtained by complete carbonization at an ordinary firing temperature without subjecting to oxidation treatment and fibers of aluminum, steel, copper or the like having a high electrical conductivity.

For the short fibers having a volume resistivity of $10^{-1}$ Ωcm or more, mention may be made of, for example, the above carbon fibers increased in volume resistivity, fibers of germanium, glass fibers and silicon carbide fibers.

Either one kind or two or more kinds of these short fibers may be used as far as they have a volume resistivity of $10^{-1}$–$10^3$ Ωcm. It is also possible to use the short fibers having a volume resistivity of $10^{-1}$–$10^3$ Ωcm and the short fibers having a volume resistivity other than that of the above range and besides, it is possible to use two or more kinds of these short fibers, respectively.

When the short fibers having a volume resistivity of less than $10^{-1}$ Ωcm are used, these are used in combination with those which have a volume resistivity of $10^{-1}$ Ωcm or more. In this case, too, two or more kinds of these short fibers having the respective volume resistivities may be used. When the short fibers are used in combination, the amount of those which have a volume resistivity of $10^{-1}$ Ωcm or more is at least 20% based on the total amount of the short fibers. Preferable combination of the short fibers having the respective volume resistivities is a combination of general carbon fibers having a volume resistivity of less than $10^{-1}$ Ωcm with carbon fibers or glass fibers having a volume resistivity of $10^{-1}$ Ωcm or more. The reason why this combination is preferred is that these fibers have been sufficiently studied as reinforcing fibers for resins and are easier in determination of their specific addition amounts and mixing methods than other fiber materials in industrialization thereof.

The shape of the short fibers is preferably 3–25 μm in diameter and preferably 10 μm–5 cm, more preferably 50 μm–5 cm, most preferably 50 μm–15 mm in length.

When the fiber length is less than 50 μm, formation of conductive path occurs at a certain addition amount as a critical point like carbon black and hence, conductivity increases abruptly to make it difficult to control the resistivity in the range of $10^9$–$10^{11}$ Ωcm.

When the fiber length is more than 5 cm, adjustment of addition amount begins to become difficult and besides, dispersibility of the fibers in the polymer becomes inferior and it is also difficult to control the resistivity in the range of $10^9$–$10^{11}$ Ωcm.

The fiber length is most preferably 50 μm–15 mm because the fibers in this range are easy in incorporating into thermoplastic resins for injection molding.

The reason why the short fibers having a volume resistivity of $10^{-1}$–$10^3$ Ωcm are preferred in the present invention is that when the volume resistivity is less than $10^{-1}$ Ωcm, electrical conductivity is abruptly imparted to resin compositions by adding them in a small amount and thus, control of the volume resistivity is difficult and when it is more than $10^3$ Ωcm, there is the problem that it is difficult even with addition of them in a large amount to impart conductivity to the resin compositions.

In order to obtain the short fibers having the volume resistivity in the above range, it is convenient to use materials having a volume resistivity of $10^{-1}$–$10^3$ Ωcm which are formed into fibers or fiber materials which are processed to have a volume resistivity of $10^{-1}$–$10^3$ Ωcm.

When the short fibers having a volume resistivity of $10^{-1}$–$10^3$ Ωcm are not used, it is not disadvantageous to use the electrically conductive type short fibers having a volume resistivity of less than $10^{-1}$ Ωcm and insulation type short fibers having a volume resistivity of $10^{-1}$ Ωcm or more in admixture. As combination of the electrically conductive short fibers and the insulating short fibers, there may also be used combinations of the short fibers having an extreme conductivity and the short fibers having an extreme insulation such as glass fibers and carbon fibers and metallic fibers and silicon carbide fibers. The most ideal combination is that of glass fibers and carbon fibers as aforementioned.

Among these fibers, the most advantageous are chopped strands of carbon fibers controlled in electrical conductivity so that they have a volume resistivity of $10^{-1}$–$10^3$ Ωcm and mixtures of chopped strands of general carbon fibers having high electrical conductivity and chopped strands of carbon fibers controlled in electrical conductivity.

The carbon fibers controlled in their electrical conductivity can be obtained, for example, by subjecting carbon fibers to oxidation treatments such as oxidation with chemicals such as nitric acid and vapor phase oxidation with air, oxygen, ozone or the like or by incomplete carbonization at a firing temperature of lower than 800° C.

The polymers used in the present invention are most preferably thermoplastic resins, but thermosetting resins and fibers may also be used. As the thermoplastic resins, there may be used, for example, general-purpose elastics such as polyethylene, polypropylene, polystyrene and polyacrylstyrene, engineering plastics such as ABS (acrylonitrile-butadiene-styrene) resin, polyphenyl ether, polyacetal, polycarbonate, polybutylene terephthalate, polyethylene terephthalate, nylon-6 and nylon-6,6, and so-called superengineering plastics such as polyether ether ketone, polyetherimide, polyether sulfone and polyphenylene sulfide.

As the thermosetting resins, there may be used almost all of those which have been known, such as phenolic resins, epoxy resins and unsaturated polyester resins. As rubbers, there may be used various rubber materials such as natural rubber, isoprene rubber, butadiene rubber, styrene-butadiene rubber, chloroprene rubber, nitrile rubber, ethylene-propylene rubber, acrylic rubber, epichlorohydrin rubber, polysulfide rubber and urethane rubber.

In preparing the composition comprising a polymer and short fibers, the blending ratio of polymer/short fibers in parts by weight is 90/10–60/40.

Since the main purpose for use of short fibers is not reinforcement in view of the object of the present invention, high mechanical strength is not required for moldings made from the composition. However, electrical conductivity is insufficient when the ratio of the short fibers is less than 10 parts by weight and compounding is difficult when it is more than 40 parts by weight not only in the present invention.

It is necessary that the volume resistivity of the composition is in the range of $10^5$–$10^{13}$ $\Omega$cm, preferably $10^6$–$10^{12}$ $\Omega$cm, more preferably $10^7$–$10^{11}$ $\Omega$cm. When it is to be less than $10^5$ $\Omega$cm, use of normal conductive fillers is effective and when it is more than $10^{13}$ $\Omega$cm, antistatic effect and dust removing effect cannot be obtained.

The composition of polymer and short fibers can be obtained by known methods, for example, compounding the polymer and the short fibers by extruders and injection molding the resulting compound when the polymer is thermoplastic resin; preparing BMC (bulk molding compound) or SMC (sheet molding compound) when the polymer is thermosetting resin; and kneading the short fibers into the polymer with heating when the polymer is rubber in the same manner as in the case of the thermoplastic resin. Of course, the method is not limited to the injection molding method and the SMC method.

The short fibers can be surface-treated with coupling agents or the like as far as the volume resistivity of the composition is within the range of $10^5$–$10^{13}$ $\Omega$cm.

The present invention will be explained in more detail by the following nonlimiting examples.

The volume resistivity of the short fibers in the Examples was measured by the following method.

A strand of the fibers to be measured was separated and a monofilament of 4–5 cm were taken and fixed by a conductive coating on a copper plate of 25 mm in span.

Measurement of resistivity was conducted by digital multimeter SC-7402 (manufactured by Iwasaki Tsushinki Co.).

The volume resistivity was obtained from the following formula.

$$S_f = \pi \cdot d^2 \cdot R_f / 4l$$

$S_f$: Volume resistivity ($\Omega$cm)
D: Diameter of monofilament (cm)
$R_f$: Resistivity of test fibers ($\Omega$)
l: Length of monofilament (cm) (This is the span of the copper plate in the calculation.)

Junichi Matsui, "Development of Carbon Fibers and Method for Evaluation thereof", pages 225–226, edited by Carbon Material Society can be referred to for the above measurement of volume resistivity.

REFERENCE EXAMPLE 1

Production of Carbon Fiber Chopped Strands of High Electrical Resistance

An optically isotropic precursor pitch for carbon fiber was melt spun from a spinning apparatus having a bushing of 1000 holes to obtain strands of pitch fibers. The pitch fibers were heated to 300° C. at a rate of 0.5° C./min in the air and kept at that temperature for 10 minutes to infusibilize them. The infusibilized fibers were heated to 900° C. at a rate of 10° C./min in a nitrogen stream and kept at that temperature for 10 minutes to make carbon fibers. Volume resistivity of the resulting carbon fibers was $8.0 \times 10^{-3}$ $\Omega$cm. Then, the carbon fibers were heat treated in the air at 400° C. for 120 minutes to oxidize the surface of the fibers. Volume resistivity of the fibers was 2.5 $\Omega$cm.

The carbon fiber strands obtained above were dipped in an epoxy resin emulsion of 2% in solid content and then, dehydrated in a drier. Thereafter, the strands were made into chopped strands of 3 mm in length.

REFERENCE EXAMPLE 2

Production of Ordinary Carbon Fibers The Infusibilized Fibers in the Reference

Example 1 were heated to 1000° C. at a rate of 10° C./min in a nitrogen stream and kept at that temperature for 10 minutes to make carbon fibers. Volume resistivity of the resulting carbon fibers was $5.3 \times 10^{-3}$ $\Omega$cm.

In the same manner as in Reference Example 1, the resulting carbon fiber strands were dipped in an epoxy resin emulsion of 2% in solid content and then, dehydrated in a drier and thereafter, the strands were made into chopped strands of 3 mm in length.

REFERENCE EXAMPLE 3

Production of Carbon Fiber Chopped Strands of High Electrical Resistance

The infusibilized fibers in the Reference Example 1 were heated to 800° C. at a rate of 10° C./min in a nitrogen stream and kept at that temperature for 10 minutes to make carbon fibers. Volume resistivity of the resulting carbon fibers was $3.1 \times 10^{-2}$ $\Omega$cm. Then, the carbon fibers were heat treated in the air at 400° C. for 60 minutes to oxidize the surface of the fibers. Volume resistivity of the fibers was $3.5 \times 10^1$ $\Omega$cm.

In the same manner as in Reference Example 1, the resulting carbon fiber strands were dipped in an epoxy resin emulsion of 2% in solid content and then, dehydrated in a drier and thereafter, the strands were made into chopped strands of 3 mm in length.

EXAMPLE 1

Thermoplastic Resin Composition Prepared Utilizing the Chopped Strands of Reference Example 1 and Method of Controlling Electrical Resistance The chopped strands obtained in Reference Example 1 were incorporated into ABS resin GR-2000 (manufactured by Denki Kagaku Kogyo K.K.) in the amounts of 10, 20 and 30% by weight based on the total weight and dryblended. Each of the dryblends was introduced into a single screw extruder to make a compound. Then, pellets of this compound were molded by an injection molding machine under the conditions of cylinder temperature 230° C. and mold temperature 70° C. to make a resin composition molding of 2 mm in thickness, 24.5 mm in width and 49.5 mm in length as a test piece.

Resistivity of the resulting test pieces was measured by Hiresta IP (Mitsubishi Petrochemical Co., Ltd.) ring-shaped probe for $10^4$ $\Omega$ or more and by Loresta AP (Mitsubishi Petrochemical Co., Ltd.) four terminal probe for less than $10^4$ Ωcm. The results are shown in Table 1.

TABLE 1

| Content of carbon fiber (% by weight) | Volume resistivity of test piece (Ωcm) |
|---|---|
| 0 | $10^{15}$ |
| 10 | $1.1 \times 10^{13}$ |
| 20 | $3.6 \times 10^9$ |
| 30 | $1.7 \times 10^8$ |

EXAMPLE 2

Thermoplastic Resin Composition Prepared Utilizing the Chopped Strands of Reference Example 2 and Glass Fiber Chopped Strands and Method of Controlling the Electrical Resistance A compound of ABS with 10 parts by weight of the carbon fiber chopped strands of Reference Example 2 and 15 parts by weight of glass fiber chopped strands CS 3PE 331 (manufactured by Nitto Boseki Co., Ltd.) was prepared and injection molded to obtain a test piece of resin composition molding in the same manner as in Example 1. Volume resistivity of the above glass fibers was $10^{15}$ Ωcm.

Resistivity of the resulting test piece was measured in the same manner as in Example 1. Volume resistivity of the test pieces was $1.3 \times 10^8$ Ωcm.

EXAMPLE 3

Thermoplastic Resin Composition Prepared Utilizing the Chopped Strands of Reference Example 2 and Reference Example 3 and Method of Controlling the Electrical Resistance A compound of ABS with 10 parts by weight of the carbon fiber chopped strands of Reference Example 2 and 10 parts by weight of the chopped strands of Reference Example 3 was prepared and injection molded to obtain a test piece of resin composition molding in the same manner as in Example 1.

Resistivity of the resulting test piece was measured in the same manner as in Example 1. Volume resistivity of the test piece was $6.8 \times 10^7$ Ωcm.

COMPARATIVE EXAMPLE 1

Thermoplastic Resin Composition Prepared Utilizing the Chopped Strands of Reference Example 2 and Electrical Resistivity of the Compositions The carbon fiber chopped strands of Reference Example 2 were incorporated into ABS resin GR-2000 (manufactured by Denki Kagaku Kogyo K.K.) in the amounts of 10, 20 and 30% by weight based on the total weight and compounds were prepared therefrom and injection molded to obtain test pieces of resin composition moldings in the same manner as in Example 1.

Resistivity of the resulting test pieces was measured in the same as in Example 1. The results are shown in Table 2.

TABLE 2

| Content of carbon fibers (% by weight) | Volume resistivity of test piece (Ωcm) |
|---|---|
| 0 | $10^{15}$ |
| 10 | $2.6 \times 10^5$ |
| 20 | $1.1 \times 10^2$ |
| 30 | 3.6 |

The resistivities in Table 1 of Example 1 and those in Table 2 of Comparative Example 1 are shown in FIG. 1 by plotting them.

FIG. 1 shows that when the carbon fiber chopped strands of Reference Example 1 of the present invention are used, change in volume resistivity of the polymer compositions with change in the amount of the carbon fiber chopped strands is not abrupt and thus it is easy to control the electrical conductivity of the compositions (See the plot of Example 1 in FIG. 1) while when the ordinary carbon fiber chopped strands of Reference Example 2 are used, change in volume resistivity in the area of $10^6$–$10^{13}$ Ωcm abruptly occurs due to the change of only a few percent in the amount of the chopped strands and thus, this is not suitable for control of electrical conductivity (See the plot of Comparative Example 1 in FIG. 1).

EXAMPLE 4

Thermoplastic Resin Composition Prepared Utilizing the Chopped Strands of Reference Example 2 and Reference Example 3 and Method of Controlling the Electrical Resistance A compound of 80 parts by weight of polyacetal resin Duracon (manufactured by Polyplastics Co.) with 10 parts by weight of the carbon fiber chopped strands of Reference Example 2 and 10 parts by weight of the chopped strands of Reference Example 3 was prepared in the same manner as in Example 3 and injection molded under the conditions of cylinder temperature 200° C. and mold temperature 90° C. to obtain a test piece of resin composition molding of 2 mm in thickness, 24.5 mm in width and 49.5 mm in length.

Resistivity of the resulting test piece was measured in the same manner as in Example 1. Volume resistivity of the test pieces was $4.5 \times 10^7$ Ωcm.

EXAMPLE 5

Thermoplastic Resin Composition Prepared Utilizing the Chopped Strands of Reference Example 2 and Reference Example 3 and Method of Controlling the Electrical Resistance A compound of 80 parts by weight of polycarbonate resin Panlite L-1250J (manufactured by Teijin Chemical Co.) with 10 parts by weight of the carbon fiber chopped strands of Reference Example 2 and 10 parts by weight of the chopped strands of Reference Example 3 was prepared in the same manner as in Example 3 and injection molded under the conditions of cylinder temperature 300° C. and mold temperature 120° C. to obtain a test piece of resin composition molding of 2 mm in thickness, 24.5 mm in width and 49.5 mm in length.

Resistivity of the resulting test piece was measured in the same manner as in Example 1. Volume resistivity of the test pieces was $3.8 \times 10^7$ Ωcm.

EXAMPLE 6

Thermoplastic Resin Composition Prepared Utilizing the Chopped Strands of Reference Example 2 and Reference Example 3 and Method of Controlling the Electrical Resistance A compound of 80 parts by weight of polyphenylene sulfide resin Ryton R-6 (manufactured by Phillips Petroleum Co.) with 10 parts by weight of the carbon fiber chopped strands of Reference Example 2 and 10 parts by weight of the chopped strands of Reference Example 3 was prepared in the same manner as in Example 3 and injection molded under the conditions of cylinder temperature 320° C. and mold temperature 130° C. to obtain a test piece of resin composition molding of 2 mm in thickness, 24.5 mm in width and 49.5 mm in length.

Resistivity of the resulting test piece was measured in the same manner as in Example 1. Volume resistivity of the test pieces was $9.5 \times 10^6$ Ωcm.

EXAMPLE 7

Thermoplastic Resin Composition Prepared Utilizing the Chopped Strands of Reference Example 3 and Method of Controlling the Electrical Resistance A compound of 60 parts by weight of polyether imide resin Ultem (manufactured by Japan GE Plastics Co.) with 40 parts by weight of the carbon fiber chopped strands of Reference Example 3 was prepared in the same manner as in Example 1 and injection molded under the conditions of cylinder temperature 400° C. and mold temperature 130° C. to obtain a test piece of resin composition molding of 2 mm in thickness, 24.5 mm in width and 49.5 mm in length.

Resistivity of the resulting test piece was measured in the same manner as in Example 1. Volume resistivity of the test pieces was $6.3 \times 10^7$ Ωcm.

EXAMPLE 8

Thermoplastic Resin Composition Prepared Utilizing the Chopped Strands of Reference Example 3 in the Form of Milled Fibers and Method of Controlling the Electrical Resistance The carbon fiber chopped strands of Reference Example 3 were ground in a ball mill to obtain milled fibers of 50 μm in average fiber length. A compound of 70 parts by weight of polyether imide resin Ultem (manufactured by Japan GE Plastics Co.) with 30 parts by weight of the resulting milled fibers was prepared in the same manner as in Example 7 and injection molded under the conditions of cylinder temperature 400° C. and mold temperature 130° C. to obtain a test piece of resin composition molding of 2 mm in thickness, 24.5 mm in width and 49.5 mm in length.

Resistivity of the resulting test piece was measured in the same manner as in Example 1. Volume resistivity of the test pieces was $9.9 \times 10^{12}$ Ωcm.

According to the present invention, it has become possible to obtain easily and at a high productivity a fiber-containing polymer composition which are proper in both the insulation and the antistatic properties and has a certain range of electrical resistance which has hitherto been difficult to obtain by incorporating not powders such as carbon black, but materials in the form of short fibers, especially short carbon fibers controlled in electrical conductivity thereof into polymers.

What is claimed is:

1. A carbon fiber-containing polymer composition having a volume resistivity of $10^5$–$10^{13}$ Ωcm which comprises 10–40 parts by weight of carbon fibers having a volume resistivity of $10^{-1}10^3$ Ωcm and having a diameter of 3–25 μm and a length of 10 μm–5 cm, and 90–60 parts by weight of a polymer.

2. A carbon fiber-containing polymer composition having a volume resistivity of $10^5 10^{13}$ Ωcm which comprises 10–40 parts by weight of a mixture comprising carbon fibers having a volume resistivity of less than $10^{-1}$ Ωcm and having a diameter of 3–25 μm and a length of 10 μm–5 cm and carbon fibers having a volume resistivity of $10^{-1}10^3$ Ωcm and having a diameter of 3–25 μm and a length of 10 μm–5 cm, and 90–60 parts by weight of a polymer.

3. A short fiber-containing composition according to claim 1 or 2, wherein the short fibers are chopped strands of carbon fibers.

4. A short fiber-containing composition according to claim 1 or 2, wherein the polymer is a thermoplastic resin.

5. A method for controlling the volume resistivity of a polymer composition to $10^5$–$10^{13}$ Ωcm which comprises incorporating carbon fibers having a volume resistivity of $10^{-1}$–$10^3$ Ωcm and having a diameter of 3–25 μm and a length of 10 μm–5 cm into a polymer.

6. A method for controlling the volume resistivity of a polymer composition to $10^5$–$10^{13}$ Ωcm which comprises incorporating into a polymer a mixture comprising carbon fibers having a volume resistivity of less than $10^{-1}$ Ωcm and having a diameter of 3–25 μm and a length of 10 μm–5 cm and carbon fibers having a volume resistivity of $10^{-1}$–$10^3$ Ωcm and having a diameter of 3–25 μm and a length of 10 μm–5 cm.

7. A method for controlling the volume resistivity of a polymer composition to a specific value in the range of $10^5$–$10^{13}$ Ωcm which comprises incorporating carbon fibers having a volume resistivity of less than $10^{-1}$–$10^3$ Ωcm and having a diameter of 3–25 μm and a length of 10 μm–5 cm into a polymer.

8. A method for controlling the volume resistivity of a polymer composition to a specific value in the range of $10^5$–$10^{13}$ Ωcm which comprises incorporating into a polymer a mixture comprising carbon fibers having a volume resistivity of less than $10^{-1}$ Ωcm and having a diameter of 3–25 μm and a length of 10 μmm–5 cm and carbon fibers having a volume resistivity of $10^{-1}$–$10^3$ Ωcm and having a diameter of 3–25 μm and a length of 10 μm–5 cm.

9. A method according to any one of claims 5–8, wherein the short fibers are chopped strands of carbon fibers.

10. A method according to any one of claims 5–8, wherein the polymer is a thermoplastic resin.

* * * * *

UNITED STATES PATENT AND TRADEMARK OFFICE
CERTIFICATE OF CORRECTION

PATENT NO. : 5,321,071
DATED : June 14, 1994
INVENTOR(S) : Eiji FUJISAWA et al.

It is certified that error appears in the above-indentified patent and that said Letters Patent is hereby corrected as shown below:

Please note that Column 10, line 5, Claim 1, contains a typographical error wherein "$10^{-1}10^3$" should read --$10^{-1}$ - $10^3$--; Column 10, line 9, claim 2, "$10^5 10^{13}$" should read --$10^5$ - $10^{13}$--; Column 10, line 14, claim 2, "$10^{-1}10^3$" should read --"$10^{-1}$ - $10^3$--; column 10, line 17, claim 3, "short" should read --carbon--; column 10, line 18, claim 3, "short" should read --carbon--; column 10, line 20, claim 4, "short" should read --carbon--; column 10, line 52, claim 9, "short" should read --carbon--.

Signed and Sealed this

Twenty-eight Day of February, 1995

Attest:

BRUCE LEHMAN

*Attesting Officer*   *Commissioner of Patents and Trademarks*